United States Patent [19]

Shiozaki et al.

[11] Patent Number: 4,532,401
[45] Date of Patent: Jul. 30, 1985

[54] APPARATUS AND METHOD FOR CUTTING A WIRING PATTERN

[75] Inventors: Masakazu Shiozaki, Yokohama; Hidetaro Nishimura, Kawasaki, both of Japan

[73] Assignee: Tokyo Shibaura Denki Kabushiki Kaisha, Kawasaki, Japan

[21] Appl. No.: 480,382

[22] Filed: Mar. 30, 1983

[30] Foreign Application Priority Data

Mar. 31, 1982 [JP] Japan ................................ 57-53456

[51] Int. Cl.³ .............................................. B23K 26/00
[52] U.S. Cl. ...................... 219/121 LH; 219/121 LJ; 219/121 FS
[58] Field of Search .................. 219/121 LH, 121 LJ, 219/121 EJ, 121 EK, 121 FS; 364/474, 475

[56] References Cited

U.S. PATENT DOCUMENTS 3,560,258  2/1971  Brisbane ........................ 219/121 LH
3,584,183  6/1971  Chiaretta ........................ 219/121 LJ
4,190,854  2/1980  Redfern ........................ 219/121 LH

OTHER PUBLICATIONS

North et al., *IEEE Journal of Solid-State Circuits*, "Laser Coding of Bipolar Read-Only Memories", vol. SC-11, No. 4, pp. 500-504, Aug. 1976.

*Primary Examiner*—C. L. Albritton
*Attorney, Agent, or Firm*—Finnegan, Henderson, Farabow, Garrett & Dunner

[57] ABSTRACT

An apparatus for cutting a faulty spot or area of a predetermined wiring pattern by radiating a laser beam and which includes a reset table in which a wafer chip is fixed in place on a support table. A radiating device is disposed above the rest table to permit the laser beam to be directed at the wiring pattern. A positioning device is connected to the radiating device to position the laser beam. Between the radiating device and the support table a cover is disposed to define a hermetically-sealed space including the wafer chip. A hole of the cover is coupled to a vacuum pump. After the space is placed in a vacuum the laser beam is radiated toward the wiring pattern to permit the portion of the wiring pattern to be cut.

14 Claims, 5 Drawing Figures

APPARATUS AND METHOD FOR CUTTING A WIRING PATTERN

BACKGROUND OF THE INVENTION

This invention relates to an apparatus and method for cutting a wiring pattern formed on a semiconductor device.

A faulty spot or area may occur on a wiring pattern or a wiring circuit in the manufacture of semiconductor elements having semiconductor circuits including, for example, redundancy circuits. In this case, the problem can be remedied by cutting such a faulty spot or area. In the conventional method, the faulty spot or area is cut by focusing a laser beam on a predetermined portion of the wiring pattern under atmospheric pressure. As shown in FIGS. 1 and 2, for example, a wiring pattern 6 which is formed on an insulating film 4 overlying a semiconductor substrate 2 is covered by a thin insulating film 8. A laser beam B is directed from a laser beam device 9 toward a predetermined spot or area of the wiring pattern where the wiring pattern is to be cut under atmospheric pressure by the heat of the laser beam. However, the conventional method has the following disadvantages.

First, during the cutting of the wiring pattern 6, the spot or area to be cut may heat to a high temperature of about 1,000° to 2,000° C. As a result, there is a high possibility that ion atoms or ion molecules such as $Na^+$ will be liberated, causing them to be diffused into an area between the insulating films 4 and 8. Since the ion atoms or ion molecules are mobilized between the insulating films 4 and 8, a variation in the characteristic of the circuit occurs during the operation of the circuit, thus seriously affecting the operation of the circuit.

Second, during the cutting of the wiring pattern 6, only a portion of the pattern 6 is subjected to heating, melting and vaporization. As a result, a portion 8A of the insulating film 8 flies apart, as shown in FIG. 2, by the pressure of the vaporization. The portion of the wiring pattern cannot be vaporized from the molten phase until the insulating film portion 8A flies apart. Since the portion of the wiring pattern which is molten due to the high temperature involved contacts the underlying insulating film 2 for a relatively long time period, a crack 2A may occur or the underlying insulating film 2 may melt, affecting the neighboring P-N junction.

Third, the insulating films which surround the wiring pattern 6 have a thermal diffusion coefficient of about 0.008 $cm^2$/sec. in the case of, for example, an $SiO_2$ film. The thermal diffusion coefficient of air is about 0.5 $cm^2$/sec. Where, as shown in FIG. 3, the wiring pattern 6 is not covered with an overlying insulating film, that is, it is exposed, a greater amount of heat escapes into the air, greatly lowering heat efficiency.

SUMMARY OF THE INVENTION

One object of this invention is to provide an apparatus and method for cutting a wiring pattern, which permit a faulty spot or area of the wiring pattern to be effectively cut and thus exert no bad effect on the circuit.

Another object of this invention is to provide an apparatus and method which keep air in the space which has a wiring pattern to be cut, at a vacuum level, thereby reducing the generation of ions from the air and preventing diffusion of heat into the air.

Another object of this invention is to provide an apparatus and method which keep air around a wiring pattern at a vacuum level to relatively rapidly break an insulating film overlying the wiring pattern and to prevent heat exerted on the wiring pattern from causing injury to the underlying insulating film.

According to this invention, there is provided an apparatus for cutting a wiring pattern by radiating a laser beam, comprising:

placing means for placing a substrate on which the wiring pattern is formed;

vacuum means for defining a space including the wiring pattern and for keeping the space at a vacuum level less than that of an atmospheric pressure; and laser beam radiating means for radiating a laser beam toward the wiring pattern to cut the portion of the wiring pattern.

In a preferred embodiment of this invention the pressure in the space including the wiring pattern is preferred to be at a low vacuum level of $10^{-1} \sim 10^{-2}$ Torr.

DETAILED DESCRIPTION OF THE PREFERRED EMBODIMENT

The embodiment of this invention will be explained below by referring to FIGS. 4 and 5.

Figure 4:
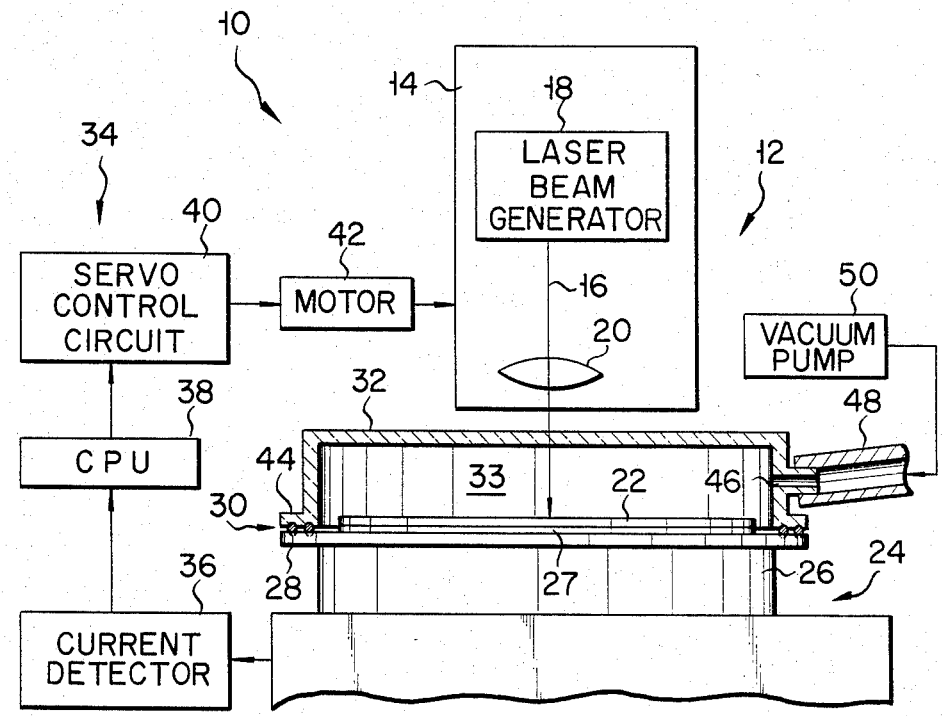
FIG. 4 shows an apparatus and method according to this invention for cutting a wiring pattern.

As shown in FIG. 4, a cutting apparatus 10 for cutting a predetermined wiring pattern includes a pressure reducing or vacuum device 12 for keeping the space including the wiring pattern at a vacuum level and radiating device 14 for irradiating the wiring pattern with a laser beam. The radiating device 14 is supported on an X-Y stage, not shown, which is movable in a plane. The radiating device 14 includes a laser beam generator 18 for generating a laser beam 16 and converging lens 20 for focusing the laser beam 16. Below the radiating device 14 a rest table 24 is located where a wafer chip 22 having a wiring pattern thereon is placed. The rest table 24 includes a support table 26 for fixing the wafer chip 22 in place. The wafer chip 22 is electrostatically attached to the support table 26, for example, through a Mylar sheet 27 so that it can be removed through the sheet 27. An outwardly extending flange 28 is formed around the edge of the support table 26. An O-ring 30 is placed between the flange 28 and the cover 32 to hermetically seal a space 33.

The cutting apparatus 10 includes a positioning device 34 for automatically positioning the radiating device in a desired position to permit the laser beam to be directed at the predetermined wiring pattern. The positioning device 34 is of a type as disclosed, for example, in U.S. application Ser. No. 390,033. The positioning device of this type will be briefly explained below. The support table 26 is connected to a current detector 36 including a known ammeter. When the laser beam 16 is radiated on a cross diffusion layer, not shown, formed on the support table 26, the current detector 36 detects peak current developed in the support table 26 to produce a detection signal. The detection signal is supplied to a control processing unit (CPU) 38 such as a microprocessor. CPU 38 executes an arithmetic operation program initially determined in response to the current detector 40 and transmits a control signal to a servo control circuit 40. The control circuit 40 supplies a drive signal to a motor 42 which in turn drives the radiating device 14 to move it into a predetermined position.

The pressure reducing device 12 is separately and hermetically mounted on the support table 26 through the O-ring 30. The pressure reducing device 12 has a cover 32 which is formed of, for example, a light-transmissive member such as quartz glass. An outwardly extending flange 44 is formed on the edge of the cover 32 and hermetically attached to the flange 28 of the support table 26 through the O-ring 30. A hole 46 is formed in the cover 32 which is connected through the hole to the end of the tube 48. The tube 48 is coupled at the other end to a vacuum pump 50.

Figure 1:
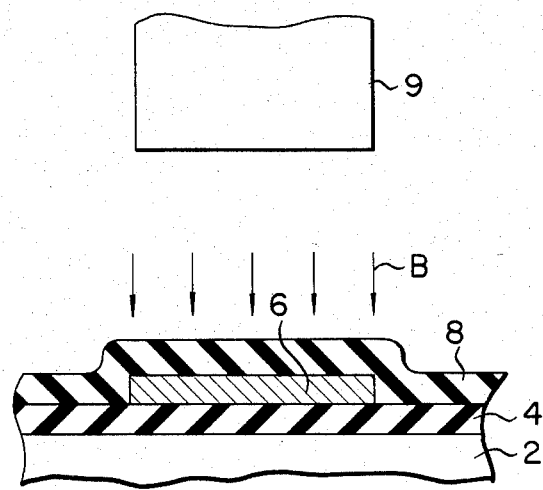
FIGS. 1, 2 and 3 are cross-sectional views showing a conventional method for cutting a wiring pattern.
Figure 2:
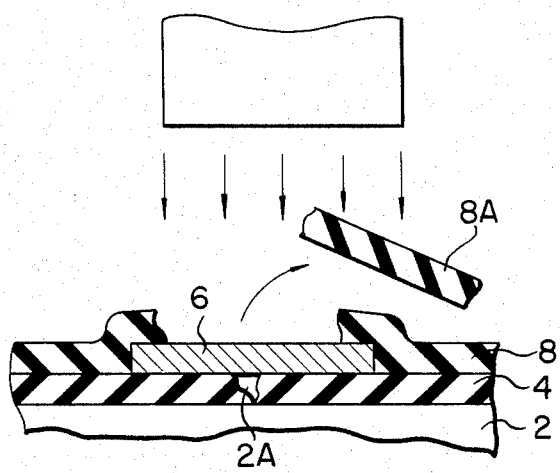
Figure 3:
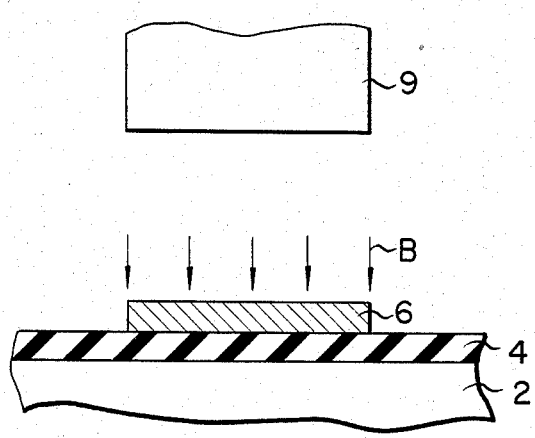
Figure 5:
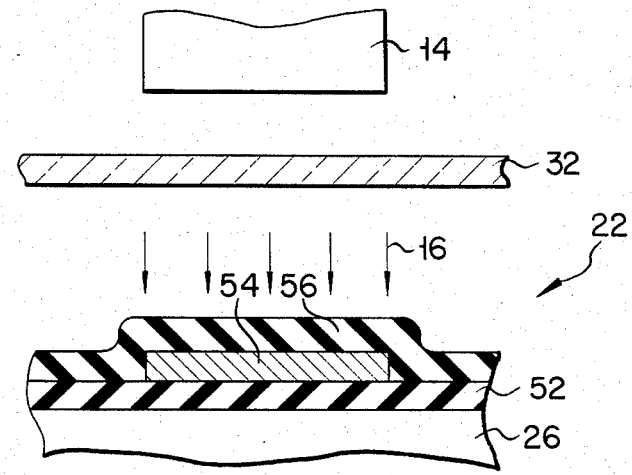
FIG. 5 is a cross-sectional view showing the portion of the pattern wiring to be cut by the embodiment of FIG. 4.

As shown in FIG. 5, an about 1 μm thick thermal oxide film (made of $SiO_2$) 52 is formed, as an underlying insulating film, in the wafer chip 22. A 6,000 Å thick polycrystalline silicon film 54 is formed, by a CVD (Chemical Vapor Deposition) method, on the thermal oxide film 52 and phosphorus is doped on the resultant structure, followed by subjecting it to patterning by PEP (Photoengraving Process). An about 7,000 Å thick oxide ($SiO_2$) film 56 is formed by the CVD method on the wiring pattern. Although in this embodiment the polycrystalline silicon is used as the wiring pattern, this embodiment is not restricted thereto and a metal such as molybdenum (Mo), tantalum (Ta) or titanium (Ti) or a silicide such as $MoSi_2$ may be used instead.

The method for cutting the pattern wiring will be explained below.

The wafer chip 22 is electrostatically attached to the support table 26 through the Mylar sheet 27. Then, the cover 32 is hermetically attached to the support table 26 through the O-ring 30. The vacuum pump 50 is driven to keep a space 33 defined between the cover 32 and the support table 26 and including the wafer chip 22, at a vacuum level. The positioning device 34 is operated to set the radiating device to a position where the laser beam 16 is radiated toward the wiring pattern to be cut. The laser beam generator 18 is operated to generate the laser beam 16. The laser beam 16 is focused through the lens 20 and penetrated through the cover toward the wiring pattern 54. Any faulty spot or area of the wiring pattern is heated by the laser beam 16 and cut. During cutting, the portion of the overlying oxide film 56, though not shown in detail, is broken apart in a relatively short time, the reason for which is as follows:

Now assume that $P_0$ denotes the atmospheric pressure, $P_T$ the pressure required for the overlying oxide film to be broken apart, and $P_V$ the pressure in the vacuum space 33. If $P_1$ denotes a pressure produced due to the vaporization of the portion of the wiring pattern when the wiring pattern is to be broken apart under a pressure of 1 atmosphere, i.e., a nonvacuum, a minimum pressure required for $P_1$, i.e., the pressure required in the conventional apparatus, can be given as:

$$P_1 = P_T + P_0$$

With the space 33 in a vacuum, i.e., where the pressure developed over the wiring pattern denotes $P_2$, the minimum pressure required for $P_2$ is expressed as follows:

$$P_2 = P_T + P_V$$

A difference $\Delta P$ between $P_1$ and $P_2$ is given below.

$$\Delta P = P_1 - P_2 = P_0 - P_V > 0$$

If a greater difference exists between the atmospheric pressure $P_0$ and the vacuum space 33, the time required for the portion of the wiring pattern to be completely cut is reduced.

This invention is not restricted to the above-mentioned embodiment and can be varied without departing from the spirit and scope of this invention.

Although in the above-mentioned embodiment only the space including the wafer chip 22 is kept at a vacuum level, the same result can also be obtained even if a space including the laser device 14 is kept in a vacuum condition.

The wafer chip is electrostatically attached to the support table 26, but this invention is not restricted thereto. For example, the wafer chip 22 may be fixed in place on the support table 26 in a vacuum condition. In this case, it is required that the support table side be kept to a vacuum level somewhat less than that of the space 33.

Although in this embodiment the radiating device 14 is moved to position the wiring pattern, the same effect can be obtained if the support table 26, for example, is moved relative to the radiating device 14 for positioning. Although, in this embodiment, the wiring pattern has been explained in connection with the wafer chip covered on all sides with the insulating film, the same result can also be obtained if use is made of an exposed wafer chip having an underlying insulating film. In this embodiment, the pressure in the space including the wiring pattern is set to a value of about $10^{-1}$, but this invention is not restricted thereto. As long as the pressure in that space is kept at a level less than the atmospheric pressure, the same effect can be obtained.

What we claim is:

1. An apparatus for cutting a wiring pattern by radiating a laser beam, comprising:
    placing means for placing a substrate on which said wiring pattern is formed;
    fixing means for fixing said substrate in place, said fixing means including an insulating material that permits said substrate to be attached to said placing means by an electrostatic attraction;
    vacuum means for defining a space including said wiring pattern and for keeping said space at a vacuum level less than atmospheric pressure; and
    laser beam radiating means for radiating a laser beam toward said wiring pattern to cut a portion of said wiring pattern.

2. An apparatus according to claim 1, wherein said insulating material is a Mylar sheet.

3. An apparatus according to claim 1, wherein said vacuum means includes a cover member mountable through sealing means.

4. An apparatus according to claim 3, wherein said cover member is made of a light transmitting material and is disposed between said laser beam radiating means and said placing means.

5. An apparatus according to claim 4, wherein said light transmitting material is quartz glass.

6. An apparatus according to claim 3, wherein said sealing means includes an O-ring hermetically mounted between said placing means and said cover member.

7. An apparatus according to claim 1, in which said vacuum means includes a vacuum pump adapted to be driven to cause a space including the wiring pattern to be kept under a vacuum level of $10^{-1}$ to $10^{-2}$ Torr.

8. A method for cutting a wiring pattern by radiating a laser beam, comprising the steps of:
   placing on placing means a substrate on which said wiring pattern is formed;
   fixing said substrate in place on said placing means by an electrostatic attraction;
   causing a space including said wiring pattern to be kept under a vacuum level less than atmospheric pressure; and
   directing said laser beam onto a portion of the wiring pattern to be cut.

9. A method according to claim 8, wherein said causing step includes sealing said space including said wiring pattern by a cover member.

10. A method according to claim 9, wherein said causing step includes hermetically coupling said placing means to said cover member by an O-ring.

11. A method according to claim 8, wherein said causing step includes keeping said space including said wiring pattern at a vacuum level by a vacuum pump.

12. A method according to claim 11, wherein said causing step includes keeping said space including said wiring pattern at a vacuum level of $10^{-1}$ to $10^{-2}$ Torr.

13. An apparatus for cutting a wiring pattern by radiating a laser beam, comprising:
   placing means for placing a substrate on which said wiring pattern is formed;
   vacuum means for defining a space including said wiring pattern and for keeping said space at a vacuum level less than atmospheric pressure;
   laser beam radiating means for radiating a laser beam toward said wiring pattern to cut a portion of said wiring pattern; and
   positioning means for detecting the position of said substrate placed on said placing means and for moving said laser beam radiating means to permit said laser beam to be directed onto said portion of said wiring pattern to be cut.

14. A method for cutting a wiring pattern using means for radiating a laser beam, comprising the steps of:
   placing on placing means a substrate on which said wiring pattern is formed;
   causing a space including said wiring pattern to be kept under a vacuum level less than atmospheric pressure;
   directing said laser beam onto a portion of said wiring pattern to be cut; and
   detecting, before said laser beam directing step, the position of said substrate on said placing means and moving said laser beam radiating means to permit said laser beam to be directed onto said portion of the wiring pattern to be cut.

* * * * *